United States Patent
Tee et al.

(10) Patent No.: US 9,078,191 B2
(45) Date of Patent: Jul. 7, 2015

(54) CONTROLLING ALLOCATION OF A PORTION OF A SHARED CHANNEL TO USE FOR CONTROL INFORMATION

(75) Inventors: Lai-King Tee, San Diego, CA (US); Neng Wang, Plano, TX (US); Yi Song, Plano, TX (US)

(73) Assignee: Rockstar Consortium US LP, Plano, TX (US)

( * ) Notice: Subject to any disclaimer, the term of this patent is extended or adjusted under 35 U.S.C. 154(b) by 886 days.

(21) Appl. No.: 12/993,322

(22) PCT Filed: Jun. 30, 2009

(86) PCT No.: PCT/US2009/049269
§ 371 (c)(1),
(2), (4) Date: Nov. 18, 2010

(87) PCT Pub. No.: WO2010/002899
PCT Pub. Date: Jan. 7, 2010

(65) Prior Publication Data
US 2011/0092243 A1    Apr. 21, 2011

Related U.S. Application Data

(60) Provisional application No. 61/076,750, filed on Jun. 30, 2008, provisional application No. 61/087,802, filed on Aug. 11, 2008.

(51) Int. Cl.
*H04W 72/00* (2009.01)
*H04W 40/02* (2009.01)

(52) U.S. Cl.
CPC .................................. *H04W 40/02* (2013.01)

(58) Field of Classification Search
USPC ........................... 455/450–455; 370/315–320
See application file for complete search history.

(56) References Cited

U.S. PATENT DOCUMENTS

| 8,116,390 B2 * | 2/2012 | Jung et al. ..................... 375/260 |
| 2006/0111129 A1 * | 5/2006 | Ihm et al. ...................... 455/466 |

(Continued)

FOREIGN PATENT DOCUMENTS

| CN | 1839595 A1 | 9/2006 |
| CN | 101040461 A | 9/2007 |

(Continued)

OTHER PUBLICATIONS

3rd Generation Partnership Project; Technical Specification; 3GPP TS 36.212 V8.3.0 (May 2008), Technical Specification Group Radio Access Network; Evolved Universal Terrestrial Radio Access (E-UTRA); Multiplexing and channel coding (Release 8) (48 pages).

(Continued)

*Primary Examiner* — Fayyaz Alam
(74) *Attorney, Agent, or Firm* — Christopher & Weisberg, P.A.

(57) ABSTRACT

To control allocation of a portion of a shared channel to use for control information, a base station determines an amount of resource elements of the shared channel to use for the control information in place of traffic data. The base station sends, to a mobile station, an indication relating to an offset parameter, where the indication is provided to allow the mobile station to compute a value for the offset parameter such that the mobile station can determine the amount of the resource elements of the shared channel to allocate for the control information.

18 Claims, 2 Drawing Sheets

(56) References Cited

U.S. PATENT DOCUMENTS

| | | | | |
|---|---|---|---|---|
| 2007/0237248 | A1* | 10/2007 | Jung et al. | 375/260 |
| 2008/0102846 | A1* | 5/2008 | Kim et al. | 455/450 |
| 2008/0123589 | A1* | 5/2008 | Lee et al. | 370/329 |
| 2008/0214198 | A1* | 9/2008 | Chen et al. | 455/450 |
| 2009/0203383 | A1* | 8/2009 | Shen et al. | 455/450 |
| 2010/0067475 | A1* | 3/2010 | Ihm et al. | 370/329 |
| 2010/0118824 | A1* | 5/2010 | Ihm et al. | 370/329 |
| 2010/0331003 | A1* | 12/2010 | Park et al. | 455/450 |

FOREIGN PATENT DOCUMENTS

| | | |
|---|---|---|
| CN | 1885849 A1 | 3/2009 |
| JP | 2008-005507 A1 | 1/2008 |
| WO | 2005008360 A2 | 1/2005 |

OTHER PUBLICATIONS

3rd Generation Partnership Project; Technical Specification; 3GPP TS 36.212 V8.6.0 (Mar. 2009), Technical Specification Group Radio Access Network; Evolved Universal Terrestrial Radio Access (E-UTRA); Multiplexing and channel coding (Release 8) (59 pages).

3rd Generation Partnership Project; Technical Specification; 3GPP TS 36.212 V8.7.0 (May 2009); 3rd Generation Partnership Project; Technical Specification Group Radio Access Network; Evolved Universal Terrestrial Radio Access (E-UTRA); Multiplexing and channel coding (Release 8) (60 pages).

Nortel, Agenda Item: 6.2, Signaling of offset parameters for computing control resources on PUSCH, 3GPP TSG-RAN WG1#54 R1-083143, Jeju, Korea, Aug. 18-22, 2008 (6 pages).

Korean Intellectual Property Office, International Search Report for PCT/US2009/049269 dated Feb. 1, 2010 (3 pages).

English_Translation_of_Chinese_Office_Action and Chinese Search Report for Chinese Serial No: 200980125232.7, dated Dec. 27, 2012 consisting of 7-pages.

English_Translation_of_Japanese_Office_Action and Japanese Search Report and Japanese Language of 1st Office issued for Japanese Serial No: 2011-516819, dated May 28, 2013 consisting of 5-pages.

Nokia Siemens Networks, Nokia, "Linkage between PUSCH MCS and Amount of Resource for Control PUSCH", 3GPP TSG-RAN Working Group 1 #53, R1-081852 (May 9, 2008) consisting of 4-pages.

2nd Chinese Examination Report and Search Report in both Chinese and its English translation dated Sep. 9, 2013 for corresponding Chinese National Stage Application Serial No: 200980125232.7, Chinese National Stage Entry Date: Dec. 30, 2010 consisting of 18 pages.

Japanese Office Action in both Japanese and its English translation dated Oct. 15, 2013 for corresponding Japanese National Stage Application Serial No: 2011-516819, Japanese National Stage Entry Date: Dec. 28, 2010, consisting of 4 pages.

Nokia Siemens Networks, Nokia, "Linkage between PUSCH MCS and amount of resources for control on PUSCH", 3GPP TSG RAN WG1 Meeting #53, Kansas City, MO, USA, May 5-9, 2008, consisting of 4 pages.

3rd Chinese Examination Report in both Chinese and its English translation dated Mar. 7, 2014 for corresponding Chinese National Stage Application Serial No. 200980125232.7, Chinese National Stage Entry Date: Dec. 30, 2010, consisting of 15 pages.

* cited by examiner

CONTROLLING ALLOCATION OF A PORTION OF A SHARED CHANNEL TO USE FOR CONTROL INFORMATION

CROSS-REFERENCE TO RELATED APPLICATIONS

This application claims priority to U.S. Provisional Application 61/076,750, filed Jun. 30, 2008, and U.S. Provisional Application 61/087,802 filed Aug. 11, 2008, both of which are incorporated herein by reference in their entirety.

BACKGROUND

Various wireless access technologies have been proposed or implemented to enable mobile stations to perform communications with other mobile stations or with wired terminals coupled to wired networks. Examples of wireless access technologies include GSM (Global System for Mobile communications) and UMTS (Universal Mobile Telecommunications System) technologies, defined by the Third Generation Partnership Project (3GPP); and CDMA 2000 (Code Division Multiple Access 2000) technologies, defined by 3GPP2.

As part of the continuing evolution of wireless access technologies to improve spectral efficiency, to improve services, to lower costs, and so forth, new standards have been proposed. One such new standard is the Long Term Evolution (LTE) standard from 3GPP, which seeks to enhance the UMTS wireless network.

According to LTE, an uplink shared control channel (PUSCH) can be used to communicate both control information and traffic data (data associated with users or applications). The PUSCH is a traffic channel, and the control information that is communicated in this traffic channel is considered to be control information that is piggybacked onto the traffic channel that is primarily assigned to communicate traffic data.

Conventionally, communicating signaling to control the amount of resource elements of the PUSCH to allocate for control information can consume substantial bandwidth in the wireless link between a base station and a mobile station.

SUMMARY

In general, according to a preferred embodiment, a method of controlling allocation of a portion of a shared channel to use for control information includes determining, by a base station, an amount of resource elements of the shared channel to use for the control information in place of traffic data. The base station sends, to a mobile station, an indication relating to an offset parameter, where the indication is provided to allow the mobile station to compute a value for the offset parameter such that the mobile station can determine the amount of the resource elements of the shared channel to allocate for the control information.

Other or alternative features will become apparent from the following description, from the drawings, and from the claims.

DETAILED DESCRIPTION

Figure 1:
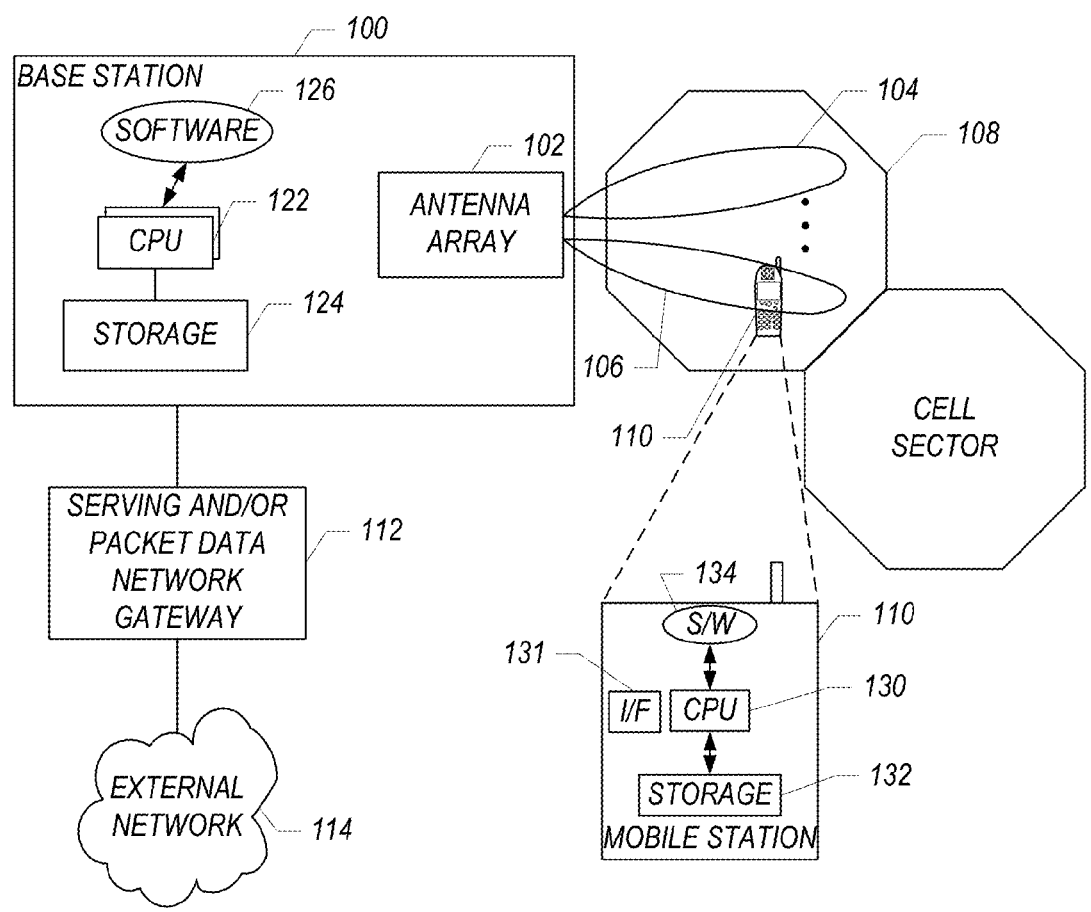
FIG. 1 is block diagram of an exemplary arrangement that includes a wireless communications network that incorporates a preferred embodiment of the invention.

In the following description, numerous details are set forth to provide an understanding of some embodiments. However, it will be understood by those skilled in the art that some embodiments may be practiced without these details and that numerous variations or modifications from the described embodiments may be possible.

In accordance with some preferred embodiments, a technique or mechanism for controlling an amount of resource elements of an uplink shared channel to allocate for communicating control information involves sending control indication(s) of reduced size from a base station to a mobile station. Sending control indication(s) of reduced size for controlling allocation of resource elements of the uplink shared channel allows the wireless channel to be more efficiently used.

In some embodiments, the control of the amount of resource elements of the uplink shared channel to assign for communicating control information is based on an offset parameter, where the offset parameter can have values expressed in decibels (dB) or other units of measure. The offset parameter is used by a mobile station to determine an amount of resource elements of the uplink shared channel to allocate for communicating control information. For improved bandwidth efficiency in the wireless channel between a base station and a mobile station, values of an offset parameter can be communicated from a base station to the mobile station using a combination of a nominal value and one or more adjustment values. The nominal value of the offset parameter can be communicated from the base station to the mobile station relatively infrequently, such as when the mobile station initially starts up or enters into a particular cell or cell sector, or when wireless channel conditions change.

After a nominal value of the offset parameter has been sent to the mobile station, the base station can subsequently send one or more adjustment values of the offset parameter, where the adjustment values are used to adjust the nominal value of the offset parameter to calculate an effective value of the offset parameter to use at the mobile station.

Efficiency is further enhanced by signaling representations of the nominal value and adjustment values, rather than their absolute values. For example, the representations can be in the form of index values that point to content of a data structure. Alternatively, the representations can be based on some other encoding.

Since the range of possible values of the offset parameter is relatively small, it is expected that the number of bits used for communicating representations of adjustment values can be smaller than the number of bits used to communicate a representation of the nominal value of the offset parameter.

There can be different nominal values of the offset parameter for different conditions. Thus, a base station can communicate these different nominal values to the mobile station for use under different conditions. In addition, there can be different types of control information. Each of the different types of control information can be associated with a corresponding set of nominal values to use under different conditions.

Examples of control information that can be sent on the uplink shared channel from the mobile station to the base station include one or more of the following. One type of control information is a precoding matrix index (PMI), which is an index (or other type of indicator) to enable selection of a precoding vector to be applied to transmissions on the downlink (from the base station to the mobile station). Another type of control information is a channel quality indicator (CQI), which is an indication of wireless channel quality between the base station and mobile station to enable selection of modulation and coding to be applied to signaling on the downlink (from the base station to the mobile station). Another type of control information is ACK/NACK (A/N) feedback information, where ACK represents an acknowledgement that is sent from the mobile station to the base station to indicate successful receipt of downlink data or signaling, and where NACK represents a negative acknowledgement to indicate unsuccessful receipt of downlink data or signaling. Yet another type of control information is a rank indicator to indicate the channel rank estimated (such as rank 1 or rank 2). The rank refers to the number of layers or codewords that can be used for downlink transmission through the wireless channel. There can be various other types of control information that can be sent from the mobile station to the base station in the uplink shared channel.

In accordance with some implementations, the uplink shared channel that can be used for communicating both control information and traffic data (e.g., user data or application data) is a physical uplink shared channel (PUSCH). The PUSCH is a traffic channel, and control information that is communicated in such traffic channel is considered control information that is piggybacked onto the traffic channel. It is undesirable to allocate too many resource elements in the PUSCH for communicating control information because that will reduce the amount of resource elements available for communicating traffic data. On the other hand, allocating too few resource elements for control information can result in unreliable communication of the control information in the PUSCH.

In the ensuing discussion, reference is made to the PUSCH. However, techniques or mechanisms according to other preferred embodiments can also be applied to other types of shared channels.

More generally, a base station signals control indicators regarding reference values and adjustment values of an offset parameter to a mobile station. The mobile station is able to determine an effective value of an offset parameter based on a "reference value" and an "adjustment value" of the offset parameter. A "reference" value can be the nominal value discussed above. Alternatively, a reference value can refer to a current or previous value of the offset parameter that is or has been used by the mobile station.

The mobile station uses the effective value of the offset parameter (as calculated from a reference value and an adjustment value) to determine the amount of resource elements of the PUSCH to allocate for communicating control information in the PUSCH from the mobile station to the base station. In some embodiments, the resource elements that are allocated are loaded with coded symbols, which are modulation symbols composed of the rate-matched, interleaved and encoded information bits.

In one example, as defined by the 3GPP TS 36.212 V8.7.0 standard, the number of coded symbols allocated is represented as Q'. 3GPP TS 36.212 provides formulas for computing Q', where different formulas are used for different types of control information. The formulas compute Q' based on the value of the offset parameter, the number of bits of the control information, a scheduled bandwidth for PUSCH transmission, and other factors. For additional details regarding computation of Q', reference is made to the 3GPP TS 36.212 standard. Reference to 3GPP TS 36.212 is intended to cover any version of the standard (whether now existing or to be developed) that defines how a number of coded symbols are allocated based on an offset parameter and other factors.

FIG. 1 shows an exemplary wireless network in which some embodiments of the invention can be provided. The wireless network includes a base station 100 that includes an antenna array or other assembly (multi-beam antenna) 102 for sending wireless signals along multiple paths 104, 106 (spatial beams) in a corresponding cell sector 108. In a different implementation, the antenna array 102 can include just a single antenna for sending wireless signals along one path.

A cell sector is one section of a cell of a cellular network. Although just two paths 104 and 106 are depicted in FIG. 1, it is noted that more than two paths (or just one path) can be provided in a cell sector in other embodiments. In alternative implementations, rather than providing multiple beams in a cell sector, it is noted that multiple beams can be provided in a cell. As used here, the term "cell segment" can refer to either a cell sector or a cell.

Although just one base station is depicted in FIG. 1, it is noted that a wireless network would typically include multiple base stations. In some embodiments, the wireless network is an LTE wireless network. In alternative embodiments, other types of wireless networks can be employed. Note that reference to a "LTE wireless network" refers to a wireless network that conforms to the requirements of the LTE standard developed by 3GPP, as that standard is modified or evolved over time, as well as to subsequent standards that evolve from LTE. Moreover, even though reference is made to LTE wireless networks in the ensuing discussion, it is noted that techniques according to preferred embodiments can also be applied to non-LTE wireless networks.

In an LTE wireless network, the base station 100 includes an enhanced node B ("eNode B"), which includes a base transceiver station that includes the antenna array 102. The base station 100 may also includes a radio network controller that cooperates with the enhanced node B. The radio network controller and/or enhanced node B can perform one or more of the following tasks: radio resource management, mobility management for managing mobility of mobile stations, routing of traffic, and so forth. Note that one radio network controller can access multiple eNode Bs, or alternatively, an eNode B can be accessed by more than one radio access controller.

More generally, the term "base station" can refer to a cellular network base station, an access point used in any type of wireless network, or any type of wireless transmitter to communicate with mobile stations.

As depicted in FIG. 1, the base station 100 includes one or more central processing units (CPUs) 122, which is (are) connected to storage 124. Moreover, the base station 100 includes software 126 that is executable on the CPU(s) 122 to perform tasks of the base station 100.

The mobile station 110 of FIG. 1 also includes one or more CPUs 130 that are connected to storage 132. The mobile station 110 also includes software 134 that is executable on the CPU(s) 130 to perform tasks of the mobile station 110. In addition, the mobile station 110 includes an interface 131 to communicate wirelessly with the base station 100.

The base station 100 is connected to a serving and/or packet data network (PDN) gateway 112, which terminates the user plane interface toward the enhanced node B and assumes the responsibility for packet routing and transfer towards an external network 114, which can be a packet data network such as the Internet or other type of network.

The arrangement depicted in FIG. 1 is provided for purposes of example. In other implementations, other wireless network arrangements are used.

In the base station, the offset parameter value is selected as a function of block error rates (BLERs) of data and control information. The offset parameter values also depend on the amount of payloads for the control information, channel conditions, and bandwidth. In some embodiments, BLERs can be provided for corresponding traffic data and control information, such as A/N control information and CQI/PMI control information. The following are examples of BLERs that can be assigned to different types of information: BLER_data, BLER_A/N, BLER_CQI.

BLER_data represents the BLER for traffic data, BLER_A/N represents the BLER for ACK/NACK feedback information (and possibly rank indicator information), and BLER_CQI represents the BLER for CQI and PMI information. A combination of BLER_data, BLER_A/N, and BLER_CQI values defines a given configuration. Different combinations of different values of BLER_data, BLER_A/N, and BLER_CQI can define corresponding multiple configurations. For a given configuration (BLER_data, BLER_A/N, BLER_CQI), a nominal offset parameter value can be defined. In some embodiments, for different payload sizes (N), multiple corresponding nominal offset parameter values can be defined. The payload size N refers to the size of the corresponding control information (e.g., A/N feedback information, rank indicator, or PMI/CQI information). A nominal value of the offset parameter is defined for each commonly used combination of BLER_data, BLER_A/N, BLER_CQI. Then a range of offset parameter values can be defined that contains a nominal value. Adjustment values can then be defined such that these adjustment values when applied to the nominal value produces a desired offset parameter value.

For a particular type of control information, the possible nominal offset parameter values can be provided in a table, such as Table 1 below for CQI/PMI information. Table 1 has two columns: an index column and a nominal offset parameter value column.

TABLE 1

| Nominal CQI offset index | Nominal CQI/PMI offset (dB) |
| --- | --- |
| 0 | 0.1 |
| 1 | 2.2 |
| 2 | 3.4 |
| 3 | 4.6 |
| 4 | 5.8 |
| 5 | 7.0 |
| 6 | 8.2 |
| 7 | 9.4 |

A base station can select one of the nominal values to communicate to the mobile station, depending on various conditions. However, as explained above, rather than send the absolute nominal offset parameter value, the corresponding index value (in the index column of Table 1) can be sent instead. For example, as shown in Table 1 above, three bits that define eight offset index values (0-7) can be communicated from the base station to the mobile station, where each offset index value corresponds to a respective nominal offset parameter value.

Another table can be maintained for adjustment values for CQI/PMI control information that can be used to adjust a nominal offset parameter value. Table 2 below lists possible adjustment values of an offset parameter.

TABLE 2

| adjustment index | adjustment value (dB) |
| --- | --- |
| 0 | −0.6 |
| 1 | −0.3 |

TABLE 2-continued

| adjustment index | adjustment value (dB) |
| --- | --- |
| 2 | 0.0 |
| 3 | 0.3 |

In accordance with some embodiments, the number of bits used to represent the index values for the adjustment offset parameter values is less than the number of bits used to represent the index values for the nominal offset parameter values. In Table 2, a two-bit adjustment index is used to communicate adjustment values of the offset parameter, where the two-bit adjustment index has four possible values (0-3) that correspond to respective adjustment values as listed in Table 2.

It is noted that the 2-bit index values of the adjustment offset parameter values are signaled more frequently than the 3-bit index values of the nominal offset parameter values, which helps to reduce signaling overhead. In addition, signaling overhead is further reduced by signaling index values rather than absolute nominal/adjustment offset parameter values. For example, for a given configuration (BLER_data, BLER_A/N, BLER_CQI), a nominal value can be selected, e.g., as the mean or median of the offset values corresponding to different values of CQI payload size N, and signaled, then an adjustment value to the nominal value can be signaled for each specific payload size N.

Table 3 below shows various index values and associated nominal offset parameter values for A/N control information (or for rank indicators).

TABLE 3

| Nominal A/N offset index | Nominal A/N offset (dB) |
| --- | --- |
| 0 | 10.6 |
| 1 | 11.8 |
| 2 | 13.0 |
| 3 | 14.2 |

In this example, the index is a 2-bit index that allows four nominal offset parameter values to be signaled to the mobile station.

The mappings between index values and nominal/adjustment offset parameter values are re-configurable by the base station. Different base station vendors may use different values in the tables. The content of the tables can be sent as part of system information for each cell.

Also, although it is mentioned that two tables of nominal values can be defined, one for the CQI/PMI information, and the other for the ACK/NACK information, it is also possible to use the same table for the nominal values. The additional granularity or the adjustments can be provided using another table containing one of the following possible adjustment values:

(i) k_delta*delta (where k_delta=..., −2, −1, 0, 1, ..., and delta can be signaled separately, or chosen from the smallest non-zero value of the table for nominal values); or
(ii) k_delta; or
(iii) non-uniformly spaced values between quantization levels.

In alternative embodiments, instead of storing nominal/adjustment offset parameter values in tables as discussed above, such offset parameter values can be stored in other types of data structures.

Generally, the range of offset parameter values can be defined as follows: the range starts at NOMINAL_OFFSET—A·Δ and ends at NOMINAL_OFFSET+B·Δ, where NOMINAL_OFFSET represents the nominal offset parameter value, where A is a predefined constant, B is another predefined constant, and Δ is another constant which can be expressed in dB. The possible range of offset parameter values can be determined empirically (based on experimentation) for different conditions. For the possible ranges of offset parameter values under different conditions, the tables (or other data structures) listing nominal offset parameter values and adjustment offset parameter values can be defined.

Figure 2:
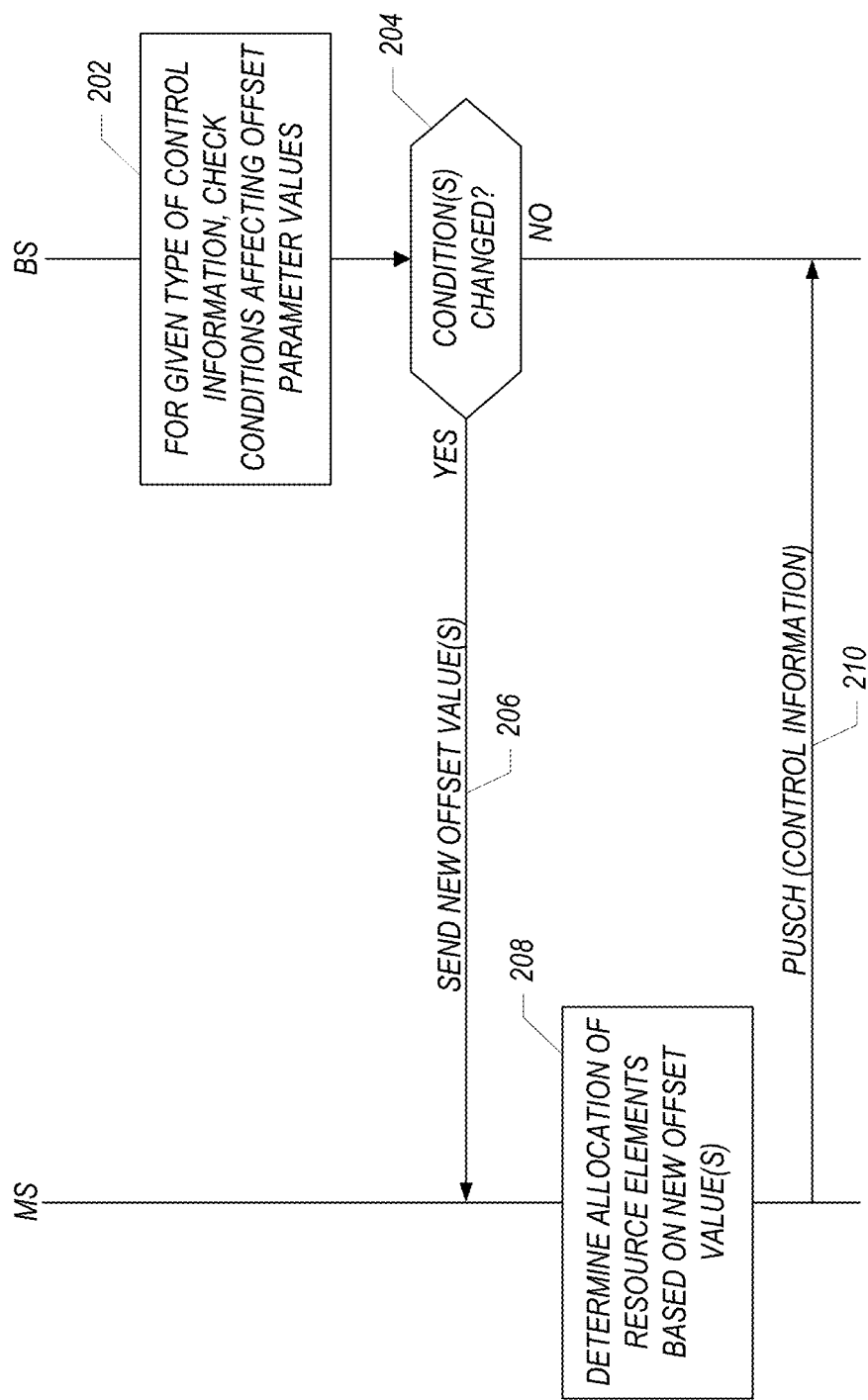
FIG. 2 is a message flow diagram of a process for controlling allocation of resource elements in a shared channel, according to an embodiment.

FIG. 2 is a message flow diagram of a process of allocating resource elements in the PUSCH according to an embodiment. For a given type of control information, such as PMI/CQI control information or A/N control information, the base station checks (at 202) conditions that affect offset parameter values. The conditions that are checked include block error rates of data and control information (including BLER_data, BLER_A/N, BLER_CQI), payload sizes of the control information, wireless channel conditions, and wireless channel characteristic (e.g. bandwidth).

The base station then determines (at 204) if the condition(s) has (have) changed by a sufficient amount such that new offset parameter value(s) has (have) to be signaled. If so, then the base station sends (at 206) the new offset parameter value(s) to the mobile station. The new offset value(s) sent can include a new adjustment offset parameter value and/or new nominal offset parameter value. For example, the base station can check Table 1 or 3 above to determine if a new nominal offset parameter value from Table 1 or 3 should be sent to the mobile station. Alternatively, the base station can check Table 2 to determine if a new adjustment offset parameter value should be sent to the mobile station.

In some implementations, the signaling of the nominal and adjustment offset values can be performed through higher-layer RRC (Radio Resource Control) signaling. In another embodiment, the adjustment offset can be signaled through physical control signaling (e.g., physical downlink control channel or PDCCH), such that it can be changed as fast as one subframe duration at the maximum. In yet another embodiment, both types of adjustment values can be signaled through physical layer control signaling. Additional details regarding the signaling are provided in 3GPP TSG-RAN WG1#54, R1-083143, dated Aug. 18-22, 2008.

Since the offset parameter values may be based on empirical data, it is possible that, as the MCS (modulation coding scheme) for PUSCH changes, the amount of control resources is not sufficient to maintain desirable received quality of the control information. In that case, RRC (Radio Resource Control) signaling of a new set of offset parameter values may not be able to correct the problem in a timely fashion. To ensure the received quality of control information, a base station can determine the MCS to be assigned for the next PUSCH transmission, taking into account the constraint of achieving sufficient control information quality. Specifically, this can be done by reversing the formula for the amount of control resources. For example, if the received BLER of control information needs to be reduced, then the amount of control resources in the formula can be increased. By expressing the code rate of the PUSCH (or parameter R in the formula) as a function of the amount of control resources for a given offset parameter value, the new code rate for PUSCH can be computed and signaled to the mobile station to cause the mobile station to allocate additional resource elements in the PUSCH for the control information. The new code rate or total amount of resource allocation can be signaled in the next resource allocation message sent from the base station to the mobile station. More generally, upon detection that the resource elements of the PUSCH allocated to control information is insufficient (such as due to detection of errors in the control information) or otherwise non-optimal (e.g., excessive amount of resource elements allocated), the base station sends updated parameter(s) in the next resource allocation message (assignment message) to the mobile station to cause the mobile station to allocate a changed (decreased or increased) amount of resource elements that would meet the quality of control information desired by the base station.

As discussed above, the base station sends index value(s) representing the new offset parameter value(s) instead of absolute values. The mobile station also stores the corresponding tables (or other data structures) that map index values to corresponding nominal/adjustment offset parameter values. Upon receiving an index value, the mobile station retrieves the corresponding offset parameter value from a respective table stored at the mobile station.

The mobile station determines (at 208) the allocation of resource elements in the PUSCH for communicating the corresponding control information based on the new offset value(s). As discussed above, the allocated resource elements are a number of coded symbols. Once the allocation of resource elements in the PUSCH has been determined, the mobile station sends (at 210) the control information (e.g., A/N information, CQI/PMI information, etc.) in the allocated resource elements in PUSCH to the base station.

By using techniques or mechanisms according to some preferred embodiments, signaling overhead associated with controlling the allocation of resource elements to communicate control information in an uplink shared channel is reduced. At the same time, flexibility is provided by providing different nominal offset parameter values for different conditions and different types of control information.

The various tasks discussed above can be performed by hardware or a combination of software and hardware in the mobile station and/or base station. If implemented with software, the instructions of such software are executed on a processor (e.g., CPU(s) 122 or 130 in FIG. 1). The processor includes microprocessors, microcontrollers, processor modules or subsystems (including one or more microprocessors or microcontrollers), or other control or computing devices. A "processor" can refer to a single component or to plural components (e.g., one or plural CPUs).

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of controlling allocation of a portion of a shared channel to use for control information, comprising:
   determining, by a base station, an amount of resource elements of the shared channel to allocate for the control information in place of traffic data; and
   sending, by the base station, to a mobile station an indication relating to an offset parameter for controlling allocation of the amount of resource elements of the shared channel for the control information, the indication being selected by the base station as a function of block error rates of data and control information and provided to allow the mobile station to compute a value for the offset parameter, and the indication reflecting an adjustment to be made with respect to a reference value of the offset parameter.

2. The method of claim 1, wherein determining the amount of the resource elements of the shared channel comprises determining the amount of the resource elements of an uplink shared traffic channel.

3. The method of claim 2, wherein determining the amount of the resource elements of the shared channel comprises determining a number of coded symbols of the uplink shared traffic channel.

4. The method of claim 1, wherein sending the indication comprises sending a representation of an absolute adjustment value for adjusting the reference value.

5. The method of claim 4, wherein sending the representation comprises sending an index value that maps to one of plural absolute adjustment values in a table.

6. The method of claim 1, further comprising:
   sending, by the base station, an indication of the reference value of the offset parameter to the mobile station.

7. The method of claim 6, wherein sending the indication of the reference value comprises sending an index that corresponds to the reference value.

8. The method of claim 7, wherein the index maps to one of plural reference values stored at the base station.

9. The method of claim 8, further comprising storing a data structure mapping plural index values to respective reference values.

10. The method of claim 9, further comprising re-configuring the mapping between the index values and the respective reference values.

11. The method of claim 6, wherein sending the indication of the reference value comprises sending an indication of a nominal value.

12. The method of claim 6, further comprising:
   determining that a condition associated with communicating the control information has changed; and
   in response to determining the changed condition, sending another indication of a different reference value of the offset parameter to the mobile station.

13. The method of claim 12, wherein determining that the condition has changed comprises determining that one or more of the following has changed:
   a block error rate,
   a wireless channel characteristic, and
   a payload size of the control information.

14. The method of claim 1, wherein sending the indication relating to the offset parameter comprises sending the indication using one of RRC (Radio Resource Control) signaling and physical control signaling.

15. The method of claim 1, further comprising:
   detecting, by the base station, that the allocated resource elements for the control information is non-optimal; and
   in response to the detecting, sending, by the base station, a resource allocation message containing one or more parameters to the mobile station to cause the mobile station to change allocation of resource elements to the control information in the shared channel.

16. A base station comprising:
   an interface configured to communicate wirelessly with a mobile station; and
   a processor in communication with the interface and configured to:
      determine an amount of resource elements of a shared channel to allocate for control information in place of traffic data; and
      send to a mobile station an indication relating to an offset parameter, the indication being selected by the base station as a function of block error rates of data and control information and provided to allow the mobile station to compute a value for the offset parameter to control allocation of resource elements of the shared channel for the control information, and the indication reflecting an adjustment to be made with respect to a reference value of the offset parameter.

17. The base station of claim 16, wherein the control information is selected from the group consisting of ACK/NACK information, a channel quality indicator (CQI), a precoding matrix index (PMI), and a rank indicator.

18. The base station of claim 16, wherein the processor is further configured to send another indication relating to the reference value of the offset parameter to the mobile station.

* * * * *